United States Patent [19]

Sharma et al.

[11] Patent Number: 5,717,795
[45] Date of Patent: Feb. 10, 1998

[54] OPTICAL WAVELENGTH DIVISION MULTIPLEXED NETWORK SYSTEM

[75] Inventors: Manish Sharma, Kawasaki; Masataka Ito, Yokohama, both of Japan

[73] Assignee: Kabushiki Kaisha Toshiba, Kawasaki, Japan

[21] Appl. No.: 389,504

[22] Filed: Feb. 16, 1995

[30] Foreign Application Priority Data

Feb. 17, 1994 [JP] Japan .................................. 6-020504
Jun. 24, 1994 [JP] Japan .................................. 6-143559

[51] Int. Cl.$^6$ .................................................. G02B 6/293
[52] U.S. Cl. .................... 385/24; 385/16; 385/46; 359/125; 359/124; 359/128
[58] Field of Search ........................ 385/24, 14, 15, 385/16, 46, 4; 359/125, 126, 124, 119, 127, 128

[56] References Cited

U.S. PATENT DOCUMENTS 5,058,101  10/1991  Albanese ........................ 385/24

Primary Examiner—Phan T. H. Palmer
Attorney, Agent, or Firm—Oblon, Spivak, McClelland, Maier & Neustadt, P.C.

[57] ABSTRACT

An optical wavelength division multiplexed network system of this invention is designed to permit communications between any of a plurality of nodes via a main trunk line constructed by interconnecting the nodes by use of an optical fiber in a ring form and includes a multi-wavelength light source for multiplexing and transmitting a plurality of lights having different wavelengths, wherein each of the nodes includes an ADM for extracting light of a particular wavelength among the lights of a plurality of wavelengths transmitted via the main trunk line into the node and inserting the light of the preset wavelength from the node into the optical fiber acting as said main trunk line, at least one optical receiver for receiving part of the light extracted by the ADM, and a modulator for modulating light extracted by ADM with data to be transmitted and send the light back to the ADM and on to the main trunk line.

16 Claims, 16 Drawing Sheets

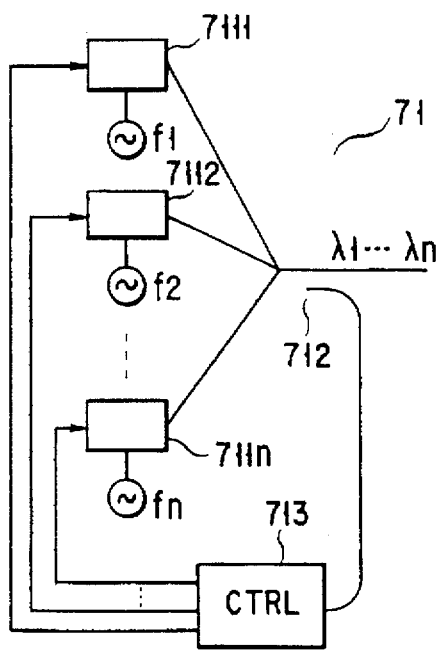
FIG. 5
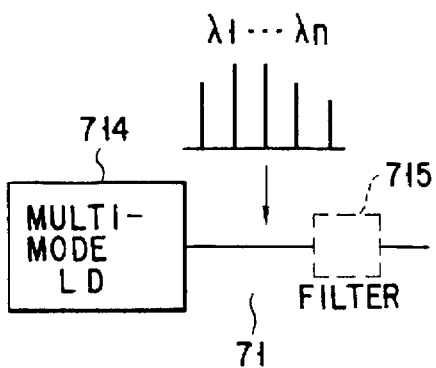
FIG. 6
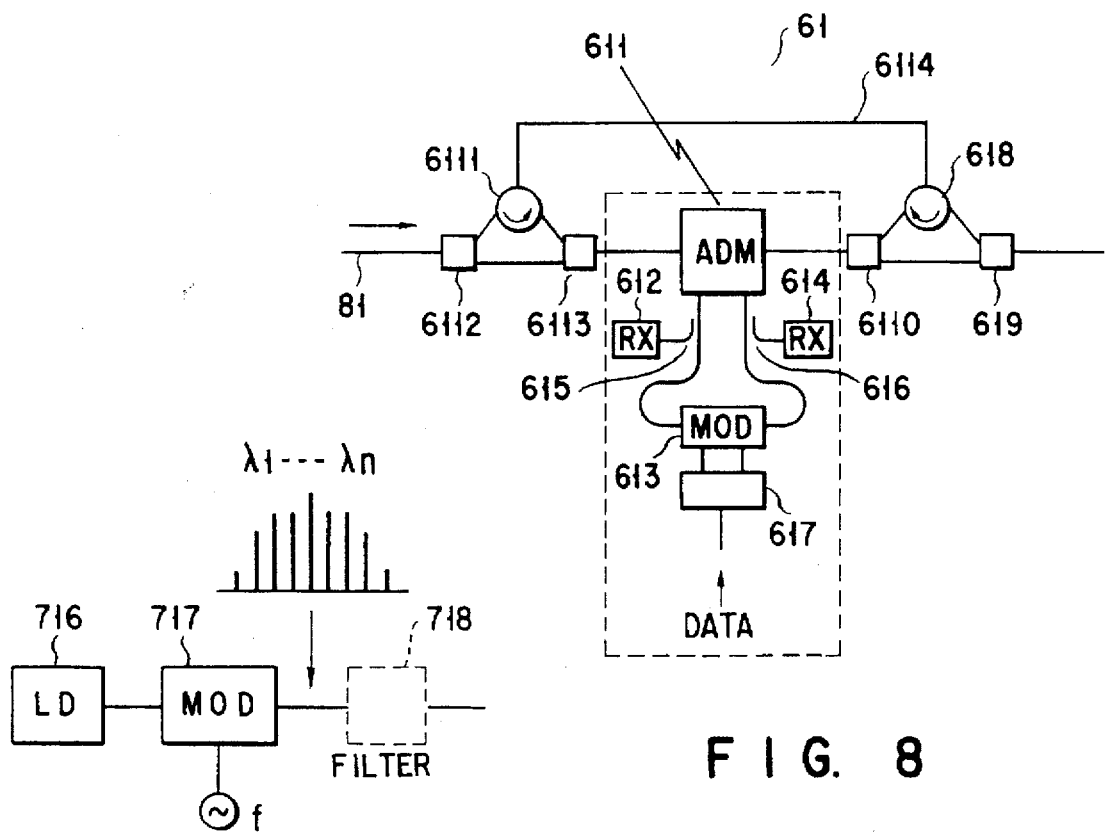
FIG. 7
FIG. 8

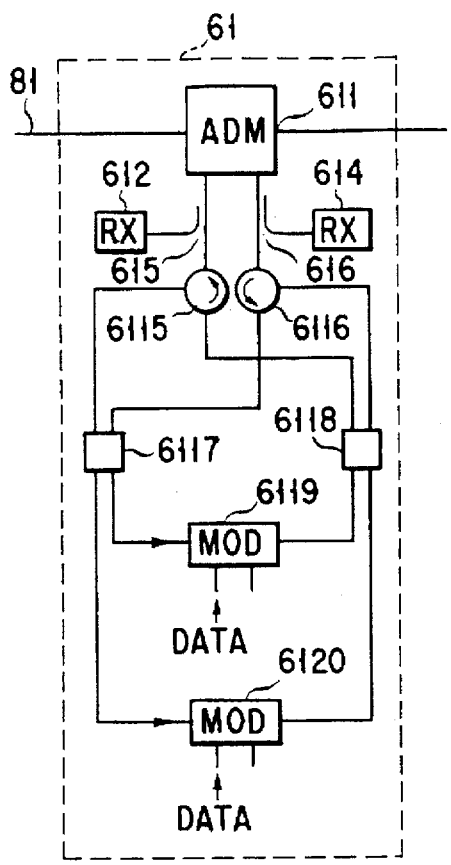
F I G. 10
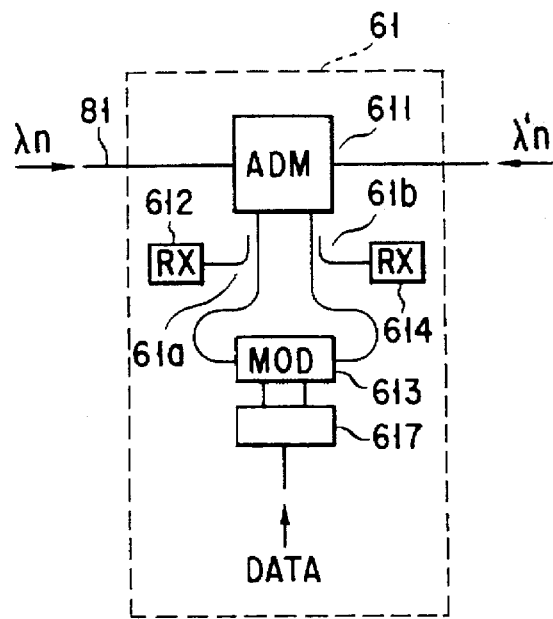
F I G. 12
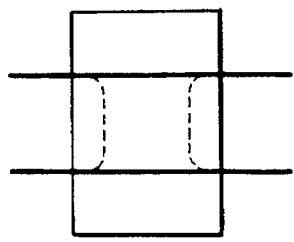
F I G. 13A
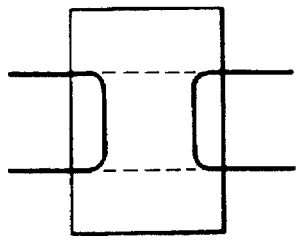
F I G. 13B
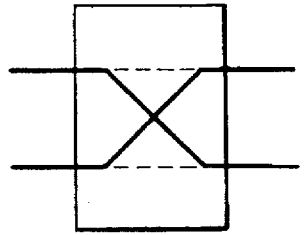
F I G. 13C

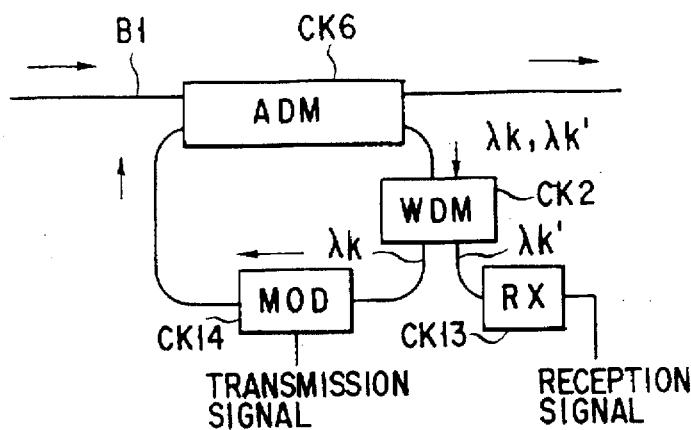
F I G. 21
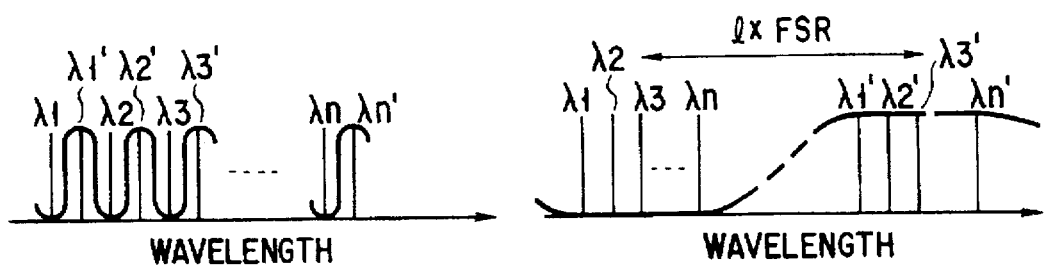
F I G. 22A            F I G. 22B
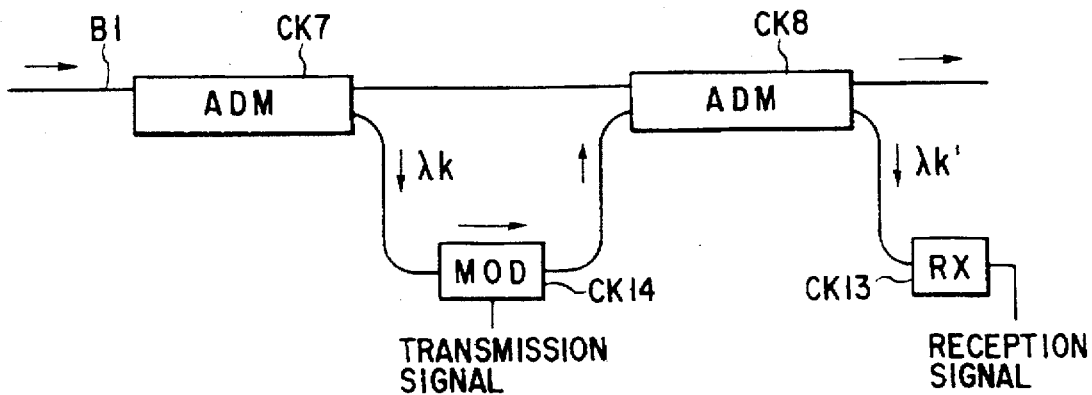
F I G. 23

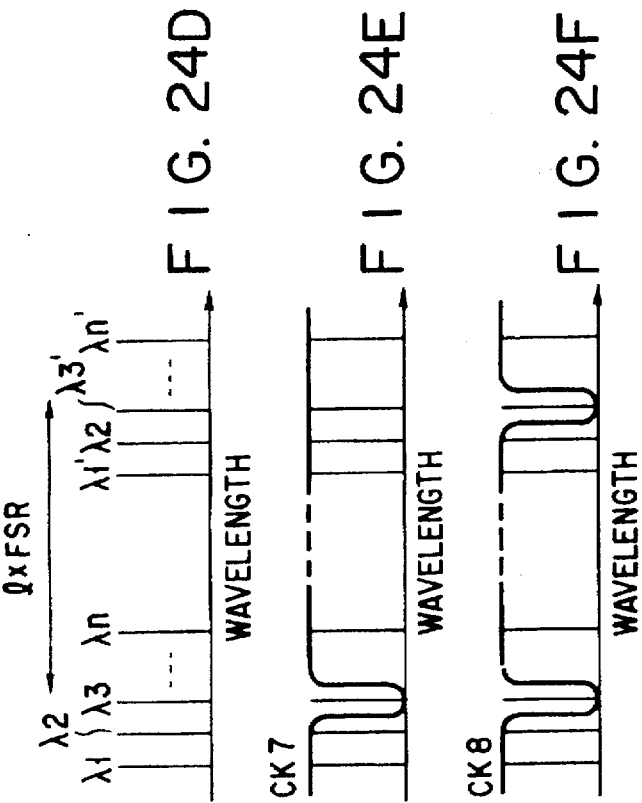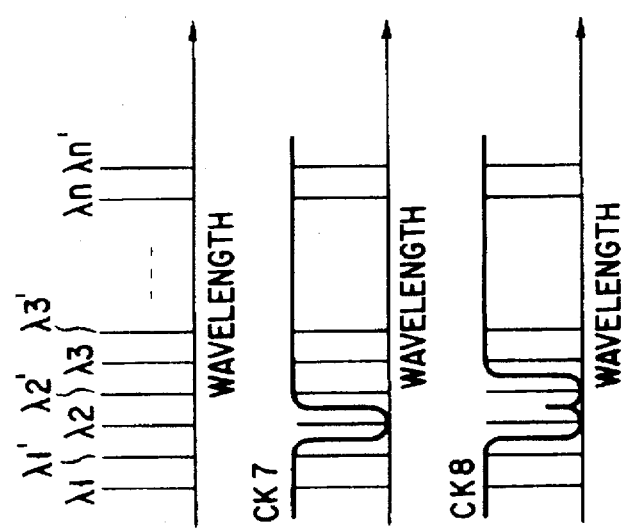

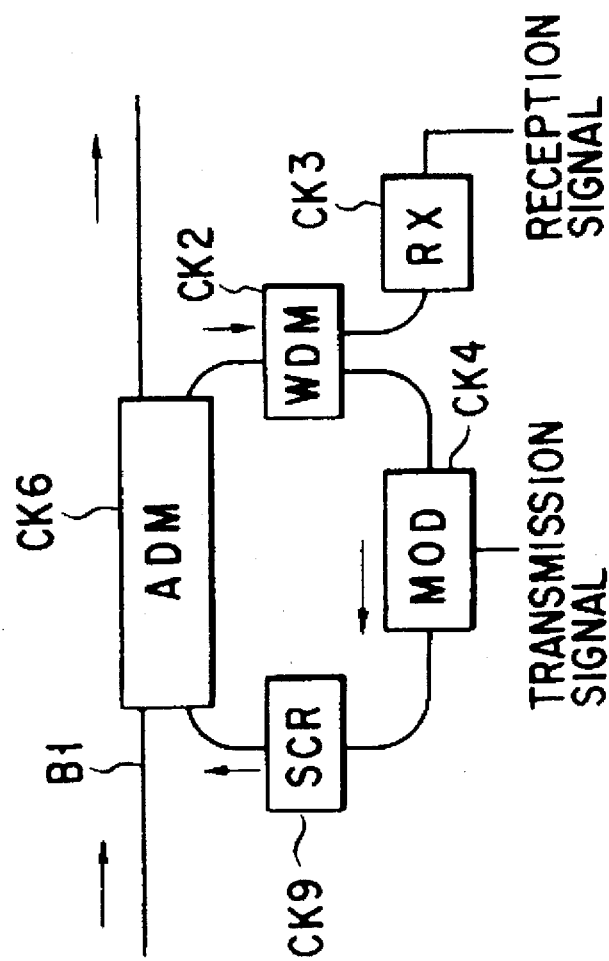
F I G. 25

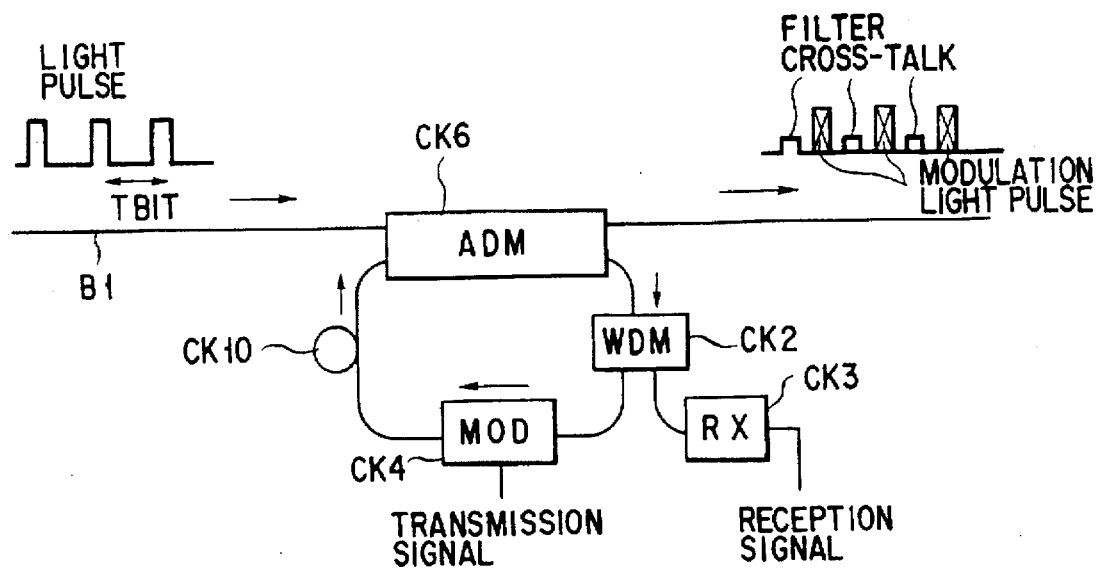
F I G. 26A
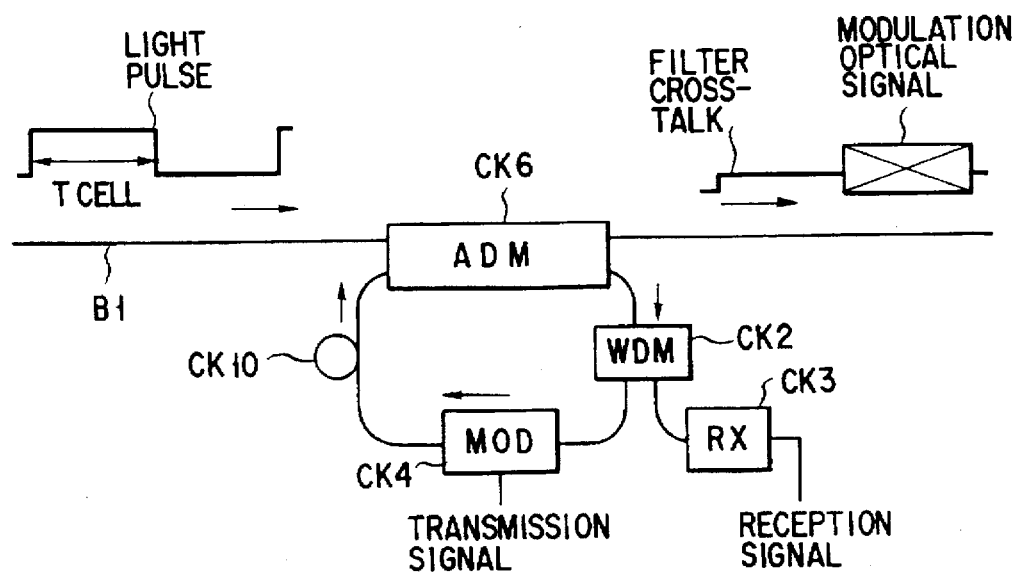
F I G. 26B

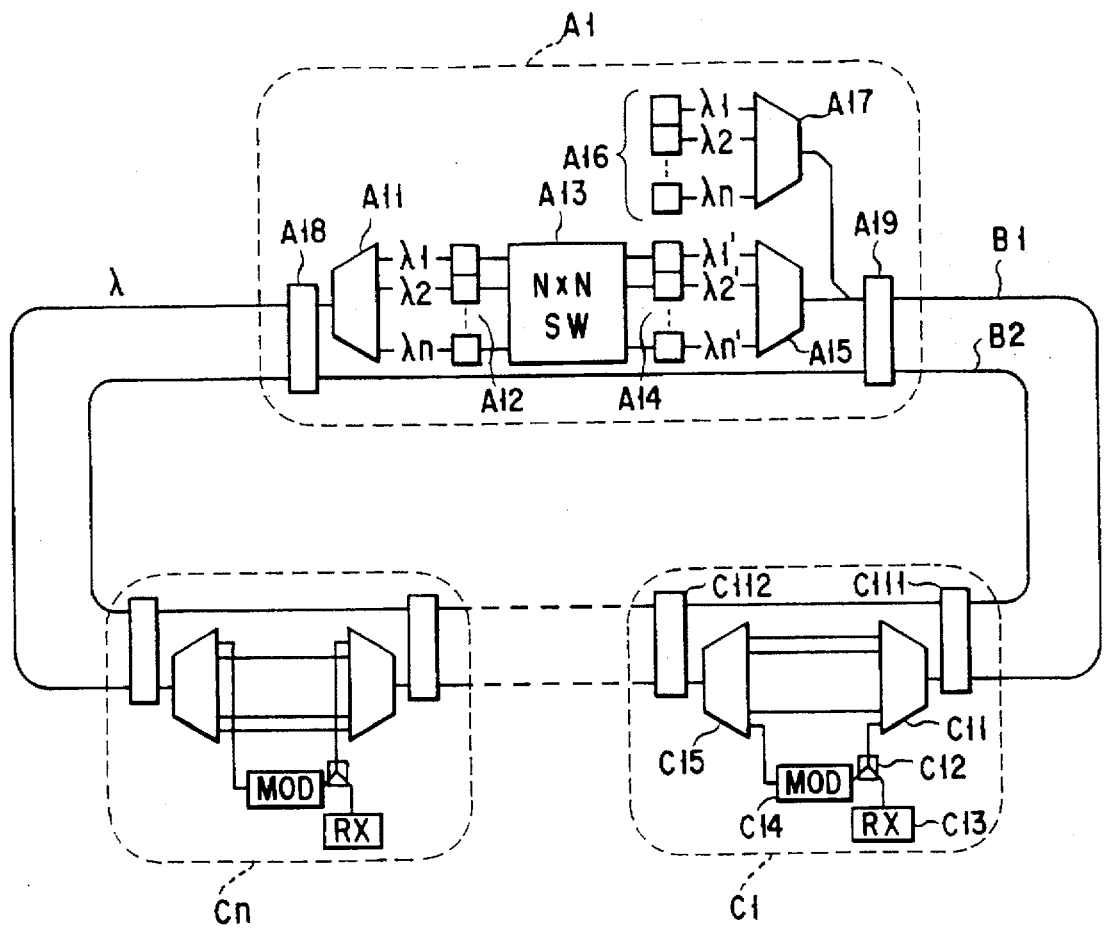
F I G. 27
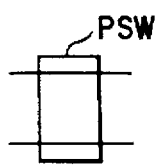
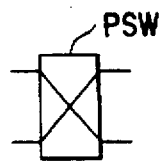
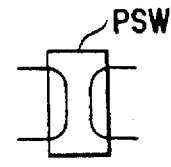
F I G. 28A    F I G. 28B    F I G. 28C

OPTICAL WAVELENGTH DIVISION MULTIPLEXED NETWORK SYSTEM

BACKGROUND OF THE INVENTION

1. Field of the Invention

This invention relates to an optical wavelength division multiplexed network system based on the optical fiber ring system.

2. Description of the Related Art

Conventionally, optical wavelength division multiplexed network systems based on the optical fiber ring system have been proposed for optical telecommunications, and particularly, a large number of so-called all optical network systems which do not require to conversion of optical signal into electrical signal or vice versa have been proposed.

FIG. 1 shows an example of the structure of a conventional optical wavelength division multiplexed network system. In FIG. 1, 11 to 16 denote nodes, and 21 denotes a main trunk line for interconnecting the nodes via an optical fiber in a ring form to permit communications between the nodes 11 to 16.

The node 11 includes an optical wavelength add-drop multiplexer (which is hereinafter referred to as an ADM), optical receiver (RX) 112, and optical transmitter (TX) 113. The receivable wavelength of the optical receiver 112 is set to a wavelength which is previously assigned for each node. The other nodes 12 to 16 have the same structure as that of the node 11. Therefore, communication with a desired one of the nodes can be attained by changing the transmission wavelength according to the destination node to be communicated on the optical transmitter 113 side.

In the example of FIG. 1, wavelengths $\lambda 1$, $\lambda 3$, $\lambda 2$, $\lambda 5$, $\lambda 6$ and $\lambda 4$ are respectively assigned to the nodes 11, 12, 13, 14, 15 and 16. The transmission signal of the node 11 is received by the node 13, the transmission signal of the node 12 is received by the node 16, the transmission signal of the node 13 is received by the node 14, the transmission signal of the node 15 is received by the node 12, and the transmission signal of the node 16 is received by the node 15.

The ADM draws out from the main trunk line 21 (which is hereinafter referred to as "drops") and inserts into the main trunk line 21 (which is hereinafter referred to as "adds") optical signals of particular wavelength. For example, in the ADM 131 of the node 13, the wavelength dropped from the terminal (1) to the terminal (2) is set to $\lambda 2$ and the wavelength added from the terminal (3) to the terminal (4) is set to $\lambda 5$ as shown in FIG. 2. As a result, the optical signal of wavelength $\lambda 2$ is dropped from the main trunk line 21 and input to the optical receiver 132 and the optical signal of wavelength $\lambda 5$ output from the optical transmitter 133 is added to the main trunk line 21.

FIG. 3 shows another structure of the conventional optical wavelength division multiplexed network system.

In FIG. 3, 31 denotes a central node, 51 to 5n denote terminal nodes, 41 denotes a main trunk line for interconnecting the nodes via an optical fiber in a ring form to permit communications between the central node 31 and the respective terminal nodes 51 to 5n.

Each of the terminal nodes 51 to 5n includes an optical wavelength demultiplexer 511 for demultiplexing or separating optical signals of wavelengths $\lambda 1$ to $\lambda n$ from the main trunk line 41, and an optical wavelength division multiplexer 514 for multiplexing optical signals of wavelengths $\lambda 1$ to $\lambda n$. Further, each terminal node includes an optical receiver (RX) 512 for receiving an optical signal of discretely assigned wavelength from the optical wavelength demultiplexer 511, and an optical transmitter (TX) 513 for transmitting an optical signal of assigned wavelength to the optical wavelength division multiplexer 514.

The central node 31 demultiplexes optical signals of wavelengths $\lambda 1$ to $\lambda n$ transmitted from the terminal nodes 51 to 5n via the main trunk line 41 in an optical wavelength demultiplexer 311, converts the optical signals into electrical signals in respective optical-electrical converters 312, and then switches the electrical signals according to destination node addresses in an N×N electronic switch (SW) 313. The electrical signals are converted into optical signals of wavelengths assigned to the respective destination nodes in electrical-optical converters 314, multiplexed in an optical wavelength division multiplexer 315 and transmitted to the main trunk line 41. With the above construction, it becomes possible to transmit an optical signal from any one of the terminal nodes to any other terminal node.

However, in the above-described conventional optical wavelength division multiplexed network system, in the former system, it is necessary to provide a plurality of light sources for generating light of wavelengths assigned to the other nodes in the optical transmitter of each node. Further, in the latter system, it is necessary to provide a light source of wavelength assigned to its own node in the optical transmitter of each terminal node. Therefore, the following problems occur. First, with the technique of manufacturing laser diodes used for the light source at present, it is difficult to control the oscillation wavelength of the laser, and therefore, it is necessary to manufactive a large number of lasers, measure the wavelengths of the lasers, and then select and use only the lasers which have the necessary wavelengths.

Secondly, since the oscillation wavelength of the laser varies with time and change in environmental conditions, some method for controlling and stabilizing the absolute wavelength of each laser and stabilizing the wavelength spacing of the lasers is necessary. In this case, if the lasers are placed at physically separated locations (particularly in the case of latter system), wavelength control becomes even more difficult, particularly if the optical signals are already modulated with data.

The above problems can be solved by use of a variable-wavelength light source or variable-wavelength optical filter, but such variable-wavelength light source or optical filter with high reliability have not been realized at present.

SUMMARY OF THE INVENTION

An object of this invention is to provide an optical wavelength division multiplexed network system based on the optical fiber ring system in which it is not necessary to provide a light source in each node and control of stabilization of the light source can be easily attained.

According to the present invention, there is provided an optical wavelength division multiplexed network system in which an optical fiber acting as a main trunk line interconnects a plurality of nodes in a ring form to permit communications between desired nodes, comprising a multi-wavelength light source for multiplexing and transmitting a plurality of lights having different wavelengths from a location in the network; and optical branching means for branching and outputting lights transmitted from the multi-wavelength light source to both ends of the main trunk line for respective wavelengths; wherein each of the nodes includes an add-drop multiplexer for dropping light of a preset wavelength among the plurality of wavelengths transmitted via the main trunk line into the node and inserting the light of the preset wavelength from the node into the optical fiber acting as the main trunk line, at least one optical receiver for receiving part of the light drawn by the add-drop multiplexer to detect the presence or absence of a signal and to receiver optical signals destined to that node, and a modulator for modulating the light drawn by the add-drop multiplexer with data to be transmitted and send the light back to the add-drop multiplexer when the optical receiver determines that no signal is present.

According to the present invention, there is further provided an optical wavelength division multiplexed network system based on an optical fiber ring system in which a cable of optical fiber is connected in a loop form to form a main trunk line between the light input and output terminals of a central node with a plurality of terminal nodes located in desired positions of the main trunk line to permit communications between desired terminal nodes via the central node, wherein the network system is a network in which different transmission wavelengths and reception wavelengths are assigned to the respective terminal nodes; the central node includes a multi-wavelength light source for generating lights of transmission wavelengths respectively assigned to the plurality of terminal nodes, optical wavelength division demultiplexer means for demultiplexing the optical signals from the main trunk line for respective wavelengths, opto-electronic converting means for receiving the optical signals of respective wavelengths demultiplexed by the optical wavelength division demultiplexer means, switching means for switching the electrical signals obtained in the opto-electronic converting means for respective destinations, electro-optic converting means for converting the electrical signals switched by the switching means into optical signals of wavelengths assigned to respective destination nodes, and optical wavelength division multiplexer means for multiplexing the optical signals transmitted by the electro-optic converting means and transmitting the multiplexed signal to the main trunk line; and each of the plurality of terminal nodes includes first optical wavelength division demultiplexer means for extracting optical signals of transmission wavelength and reception wavelength assigned to its own node from the main trunk line, second optical wavelength demultiplexer means for demultiplexing an optical signal of transmission wavelength and an optical signal of reception wavelength from the optical signal output of the first optical wavelength demultiplexer means, an optical receiver for receiving an optical signal of the reception wavelength demultiplexed by the second optical wavelength demultiplexer means, an optical modulator for modulating an optical signal of the transmission wavelength demultiplexed by the second optical wavelength demultiplexer means with data to be transmitted, and optical wavelength division multiplexer means for multiplexing the optical signal output from the optical modulator with optical signals which are not extracted by the first optical wavelength demultiplexer means and transmitting the multiplexed signal to the main trunk line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a block diagram showing the concrete construction of a multi-wavelength light source used in the above embodiment;

FIG. 6 is a block diagram showing the concrete construction of another multi-wavelength light source used in the above embodiment;

FIG. 7 is a block diagram showing the concrete construction of still another multi-wavelength light source used in the above embodiment;

FIG. 8 is a block diagram showing the concrete construction of a node when it is assumed that the main trunk line is broken down in the above embodiment;

FIG. 10 is a block diagram showing another node construction in the above embodiment;

FIG. 12 is a block diagram showing the concrete construction of a node used in the above embodiment;

FIGS. 13A, 13B, 13C are diagrams showing the switching states of optical switches used in the above embodiment;

FIG. 21 is a block diagram showing the construction of a terminal node using the ADM filter in the above embodiment;

FIGS. 22A and 22B are characteristic diagrams showing the cases of the interlace wavelength assignment system and FSR wavelength assignment system as the filter characteristics assigned to a WDM with the terminal node construction of FIG. 21;

FIG. 23 is a block diagram showing the construction of a terminal node using the ADM filter for elimination of interference noise in the above embodiment;

FIGS. 24A–24F are characteristic diagrams showing the cases of the interlace wavelength assignment system and FSR wavelength assignment system as the filter characteristics assigned to the respective ADM filters with the terminal node construction of FIG. 23;

FIG. 25 is a block diagram showing the construction of a terminal node in a case wherein a polarization or phase scrambler is used for elimination of interference noise in the above embodiment;

FIGS. 26A and 26B are block diagrams showing the construction in a case wherein a transmission optical signal is generated in a pulse form to attain another method for elimination of interference noise in the above embodiment when the period of the optical pulse train is the same as the data bit period and when the duty cycle is not larger than 50% and the optical pulse width is the same as the width of a data packet;

FIG. 27 is a block diagram showing the construction in a case wherein the protection switching is used as another embodiment of this invention; and FIGS. 28A, 28B, 28C are diagrams showing connection of a redundancy protection switch used in each node of FIG. 27.

DETAILED DESCRIPTION OF THE PREFERRED EMBODIMENTS

There will now be described an embodiment of this invention with reference to the accompanying drawings.

Figure 1:
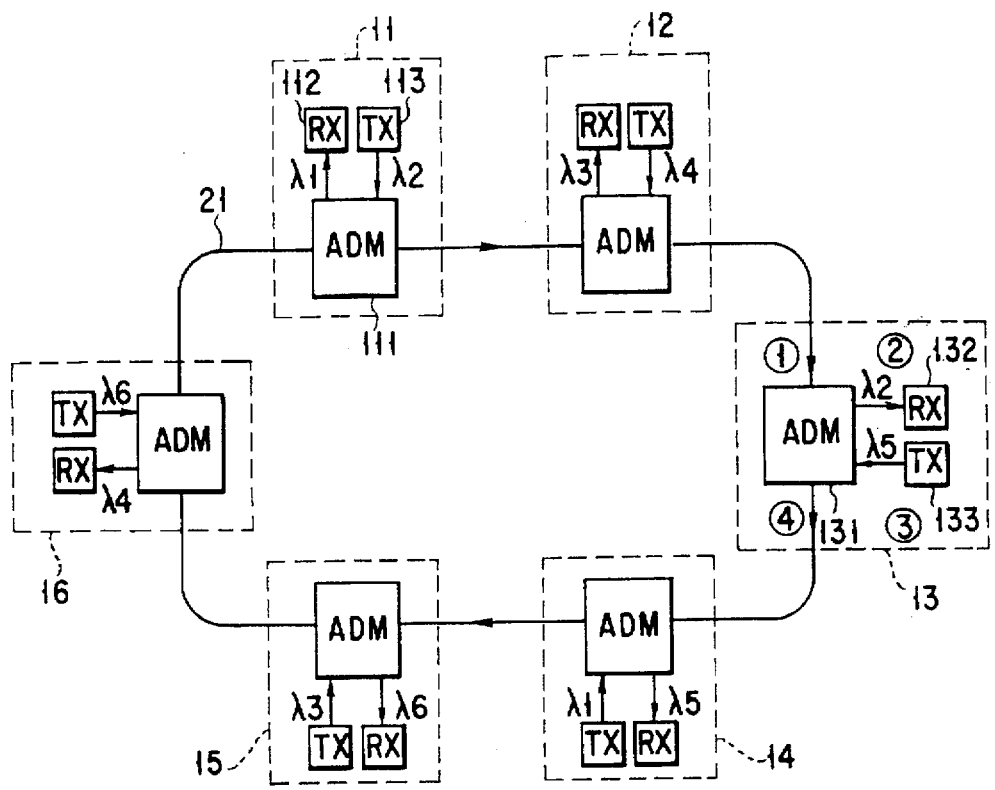
FIG. 1 is a block diagram showing an example of the construction of a conventional optical wavelength division multiplexed network system.
Figure 2:
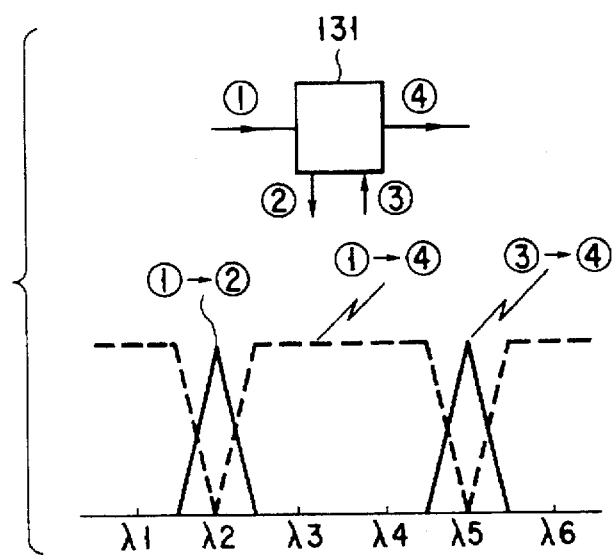
FIG. 2 is a diagram for illustrating the operation of an ADM used in the system of FIG. 1.
Figure 3:
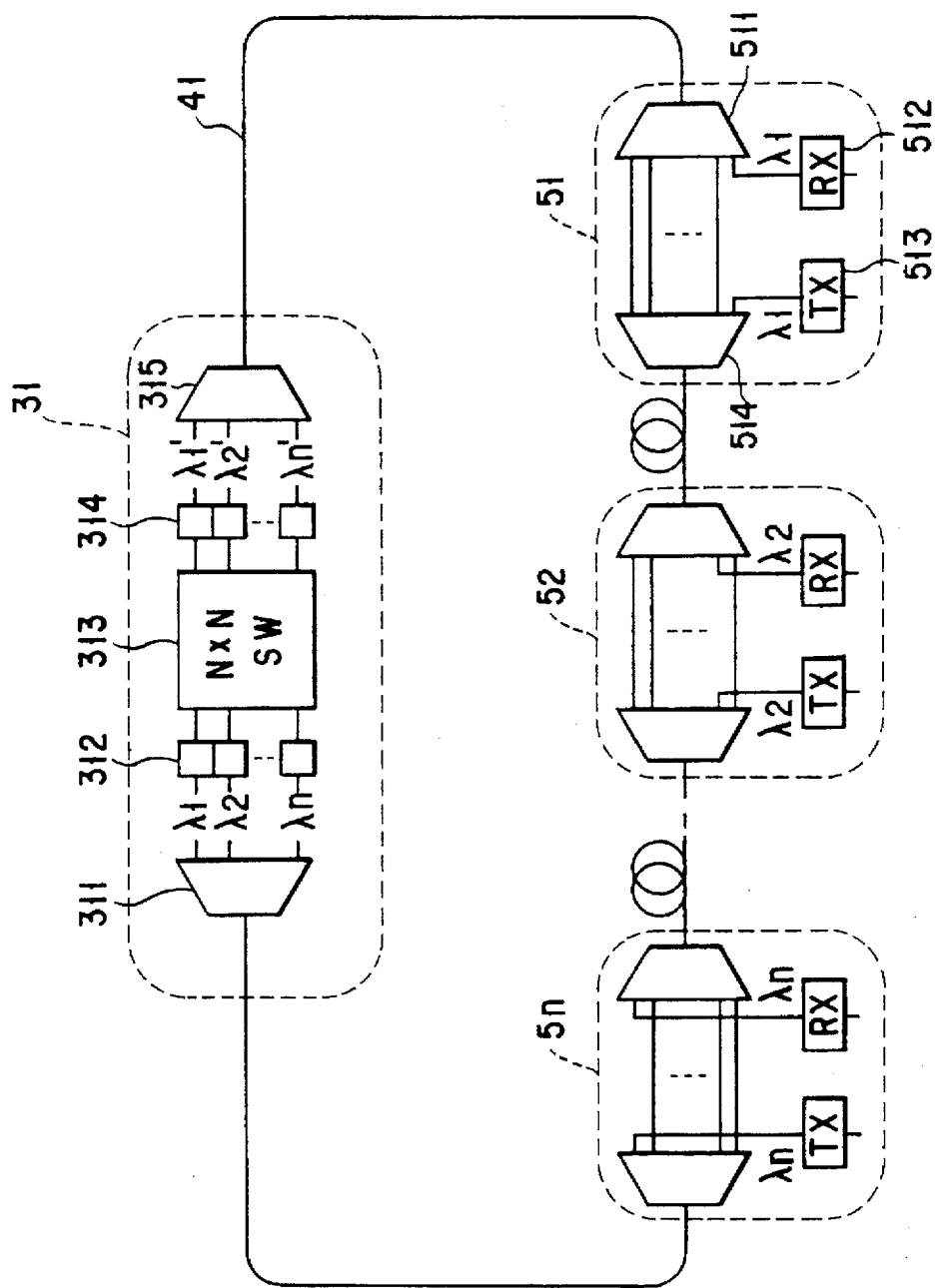
FIG. 3 is a block diagram showing another example of the construction of a conventional optical wavelength division multiplexed network system.
Figure 4:
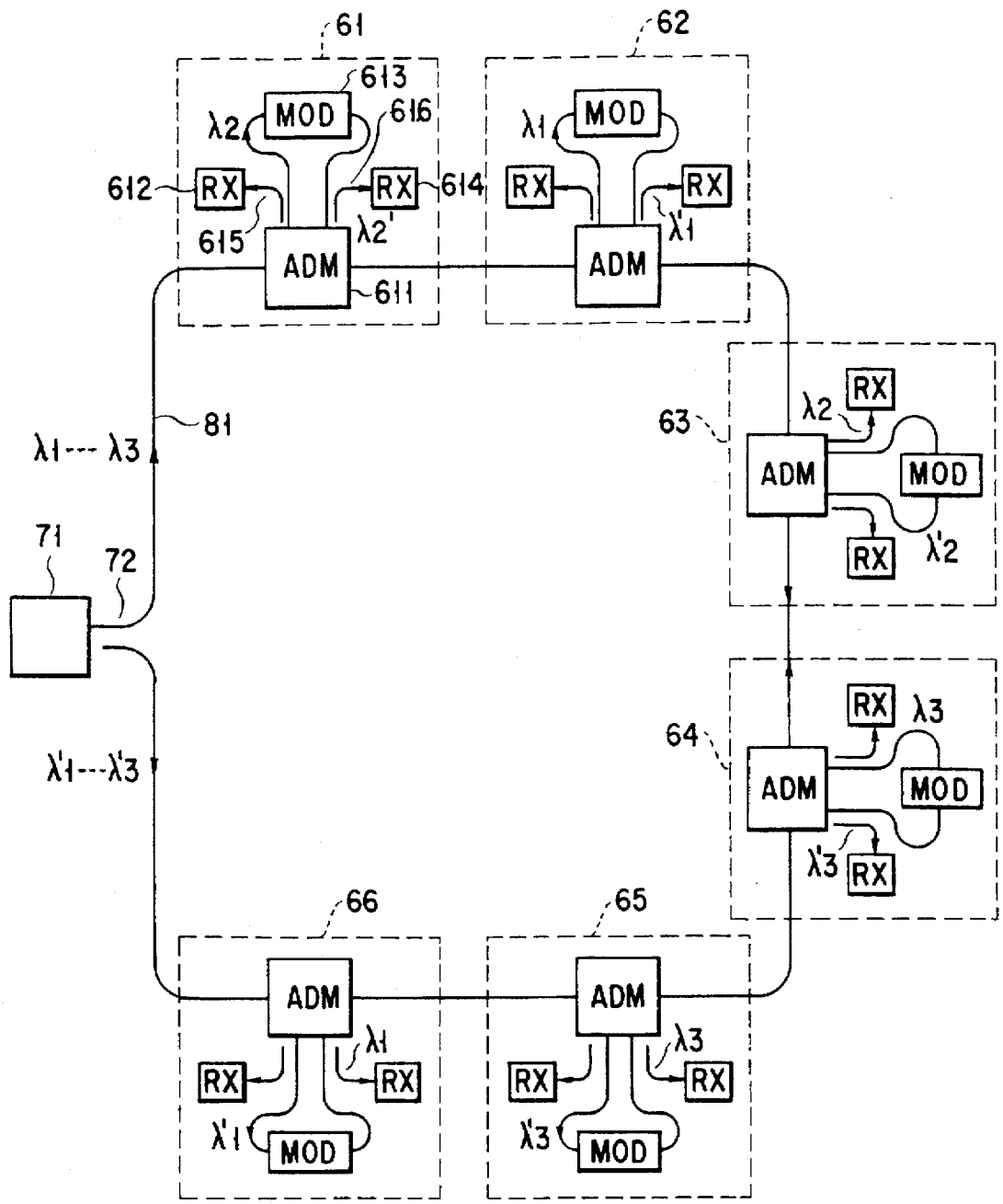
FIG. 4 is a block diagram showing an example of the construction of an embodiment of an optical wavelength division multiplexed network system according to this invention.

FIG. 4 is a block diagram showing an example of the system construction of a first embodiment according to this invention. For simplifying the explanation, in this example, a network having six nodes is explained.

In FIG. 4, 61 to 66 denote nodes, 71 denotes a multi-wavelength light source, 72 denotes a directional coupler, and 81 denotes a main trunk line formed of an optical fiber. For example, as shown in FIG. 5, the multi-wavelength light source 71 emits laser lights (CW lights) of different wavelengths $\lambda 1$ to $\lambda n$ from a plurality of single mode lasers 7111 to 711$n$ (n=6 in the case of FIG. 4) and outputs the lights in a multiplexed form. Part of the multiplexed output is branched in the directional coupler 712 and input to a wavelength controller (CTRL) 713. The wavelength controller 713 monitors the individual wavelengths of the input multiplexed lights and controls the lasers 7111 to 711$n$ such that the lights of the respective wavelengths may reach specified values.

The light output from the multi-wavelength light source 71 is branched in two directions for the respective wavelengths. In the case of FIG. 4, the light is branched into $\lambda 1$ to $\lambda 3$ and $\lambda 1'$ to $\lambda 3'$ by the directional coupler 72 and input to both ends of the main trunk line 81. In the case of FIG. 4, the lights of $\lambda 1$ to $\lambda 3$ are transmitted in the clockwise direction and the lights of $\lambda 1'$ to $\lambda 3'$ are transmitted in the counterclockwise direction.

The node 61 includes an ADM 611, optical receivers (RX) 612, 614, modulator (for example, LiNbO$_3$ modulator) 613, and optical coupler 615, 616. The other nodes 62 to 66 also have the above construction.

For example, in the node 61, light of wavelength $\lambda 2$ is dropped from the main trunk line 81 by the ADM 611. The light of $\lambda 2$ is input to the optical receivers 612, 614 via the optical coupler 615. If it is determined that the input light is not modulated as the result of monitoring by the optical receiver 612, the light is modulated according to a transmission signal by the optical modulator 613 and then output. The modulated light is transmitted to the ADM 611 via the optical coupler 616 and added to the main trunk line 81. The light of $\lambda 2$ added to the main trunk line 81 is dropped in the node 63 and received. Thus, communication from the node 61 to the node 63 can be achieved.

Likewise, in the node 66, light of $\lambda 1'$ is dropped from the main trunk line 81, modulated with data to be transmitted and added back to the main trunk line 81. The light of $\lambda 1'$ added to the main trunk line 81 is dropped in the node 62 and received. Thus, communication from the node 66 to the node 62 can be achieved.

Although not shown in the drawing in detail, when the lights of $\lambda 1$ to $\lambda 3$ transmitted in the clockwise direction by the directional coupler 72 circulates around the network loop and reaches the directional coupler 72 again, where it is appropriately terminated to prevent the optical signals from passing through the network again. This also applies to optical signals $\lambda 1'$ to $\lambda 3'$.

According to the network system of this embodiment, since the multi-wavelength light source 71 supplies wavelength-multiplexed lights to the respective nodes 61 to 66 and light dropped is modulated as it is in the nodes 61 to 66, it is not necessary to provide a light source or associated devices in each node, simplify the maintenance, and achieve communication with any desired node at low cost.

As the multi-wavelength light source 71, the following examples can be realized in addition to the above embodiment. The examples are shown in FIGS. 6 and 7.

A multi-wavelength light source 71 shown in FIG. 6 includes a multi-mode laser 714 for emitting laser light corresponding to a plurality of longitudinal modes at a fixed wavelength interval, and a filter 715 for eliminating lights of unnecessary wavelengths from the laser light output from the multi-mode laser 714.

A multi-wavelength light source 71 shown in FIG. 7 includes a single-mode laser 716, a modulator 717 for modulating the laser light output from the laser 716 with a high-frequency signal f of several GHz or more or a sign function signal, and a filter 718 for eliminating light of unnecessary wavelengths from the output from the modulator 717.

The wavelength spacing of output of the multi-wavelength light source 71 shown in FIG. 6 is determined by the physical dimensions of the multi-mode laser 714. The wavelength interval of the multi-wavelength light source 71 shown in FIG. 7 is determined by the modulation frequency f. In either case of FIGS. 6 or 7, since the number of lasers used can be reduced, the maintenance can be further simplified.

Next, in the network system with the above construction, a modification obtained in a case wherein it is assumed that the optical fiber of the main trunk line 81 interconnecting the nodes is cut off or damaged is explained with reference to FIGS. 8 and 9.

FIG. 8 shows the construction of the node 61 as a typical example and the node includes a modulation direction controller 617 in addition to the ADM 611, optical receivers 612, 614, modulator 613, optical coupler 615, 616. The modulation direction controller 617 is required when using a traveling wave type modulator to control the transmission direction of the electrical modulation signal to be the same as the transmission direction of the light.

In the node 61 with the above construction, optical switches 619 and 6110, 6112 and 6113 are located between the ADM 611 and the main trunk line 81 so as to permit insertion of optical circulators 618, 6111, which are optically connected via a bypass trunk line 6114.

With the above construction, when light is input in a direction indicated by an arrow via the main trunk line 81, the optical switch 6112 is switched to a switching position on the optical switch 6113 side so as to permit the light to be input to the node.

In the node, the normal operation is effected and the modulated light is added by the ADM 611. In this case, if the optical switch 6110 is switched to a switching position on the optical circulator 618 side, the light added to the main trunk line 81 is transmitted to the optical circulator 618 and further transmitted to the optical circulator 6111 via the bypass trunk line 6114. The light passing the optical circulator 6111 is transmitted to the optical switch 6112 again and transmitted in a direction opposite to the direction in which the light has passed the main trunk line 81. That is, the output light can reflected back by the switching operation of the optical switch 6110.

Figure 9:
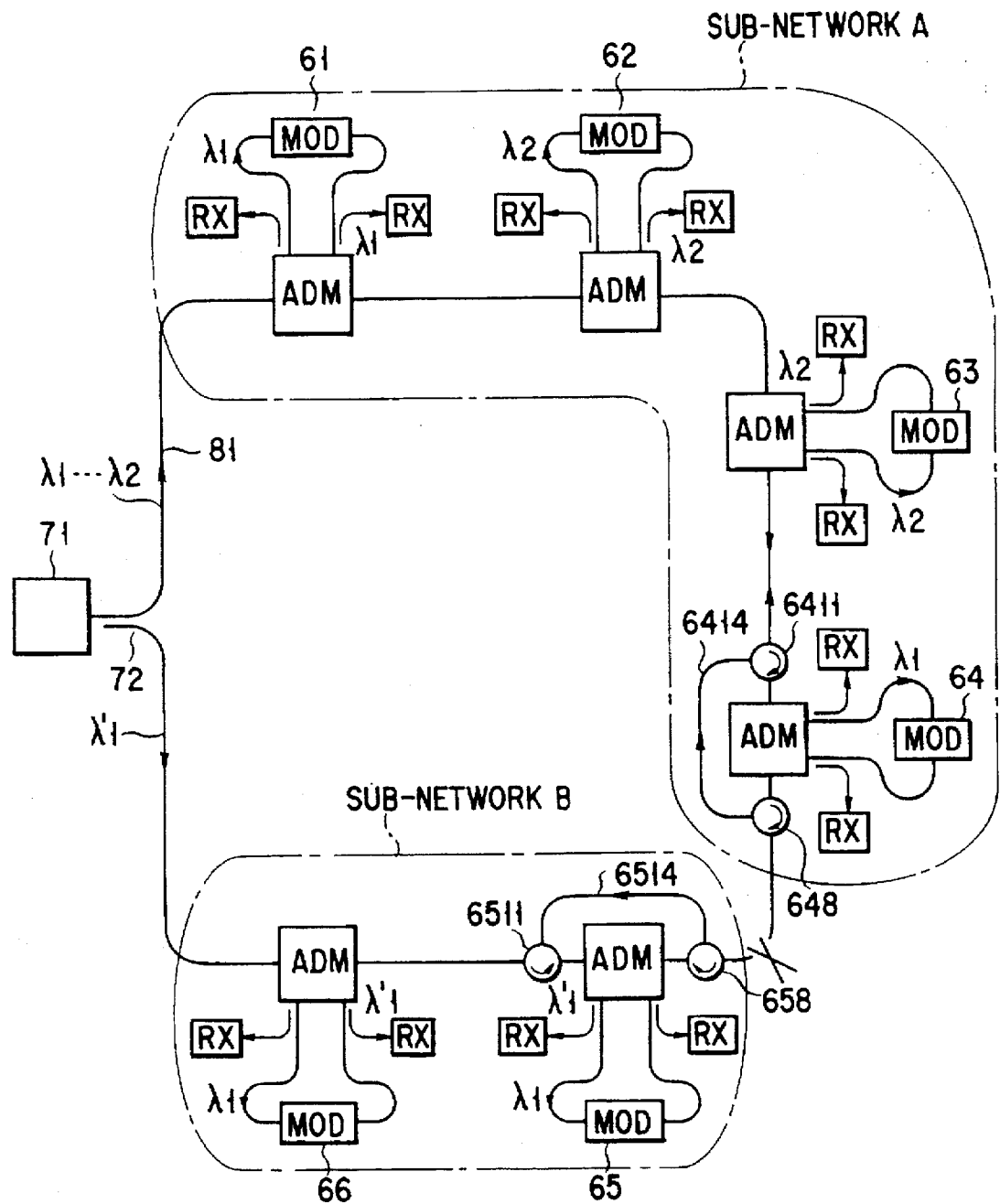
FIG. 9 is a block diagram for illustrating the operation effected when the main trunk line is broken down in the above embodiment.

Therefore, according to the above embodiment, by forming each of the nodes 61 to 66 with the above construction, sub-networks A, B can be formed simply by operating the optical switch to effect the output light in the nodes 64, 65 when the main trunk line 81 is cut off or damaged between the nodes 64 and 65 as shown in FIG. 9, for example, thereby permitting communications within the sub-networks A and B.

FIG. 10 shows another node construction in a case wherein it is assumed that the optical fiber of the main trunk line 613 interconnecting the nodes is cut off or damaged.

The node 61 shown in FIG. 10 includes optical circulators 6115, 6116, optical switches 6117, 6118, and modulators 6119, 6120 in addition to the ADM 611, optical receivers 612, 614, and optical distributors 615, 616.

One part of light dropped by the ADM 611 is received by the optical receiver 612, which the remainder is transmitted to the modulator 6120 via the optical circulator 6115 and the optical switch 6117. The light modulated by the modulator 6120 is transmitted to the ADM 611 via the optical switch 6118 and the optical circulator 6116 and then added to the main trunk line 81.

Likewise, the other part of light dropped by the ADM 611 is received by the optical receiver 614 and is transmitted to the modulator 6119 via the optical circulator 6116 and the optical switch 6117. The light modulated by the modulator 6119 is transmitted to the ADM 611 via the optical switch 6118 and the optical circulator 6115 and then added to the main trunk line 81.

Thus, the node 61 with the above construction includes two modulators 6119, 6120 to construct a double loop configuration. By changing the state of optical switches 6117, 6118, the direction of propagation of the modulated optical as be changed, as may be necessary in the event of a fiber break. With this construction, a modulation direction controller is not necessary.

In the above embodiment, the loop of the optical fiber acting as the main trunk line is single, but it is also possible to form the optical fiber in a double loop configuration for increase reliability through redundancy.

Figure 11:
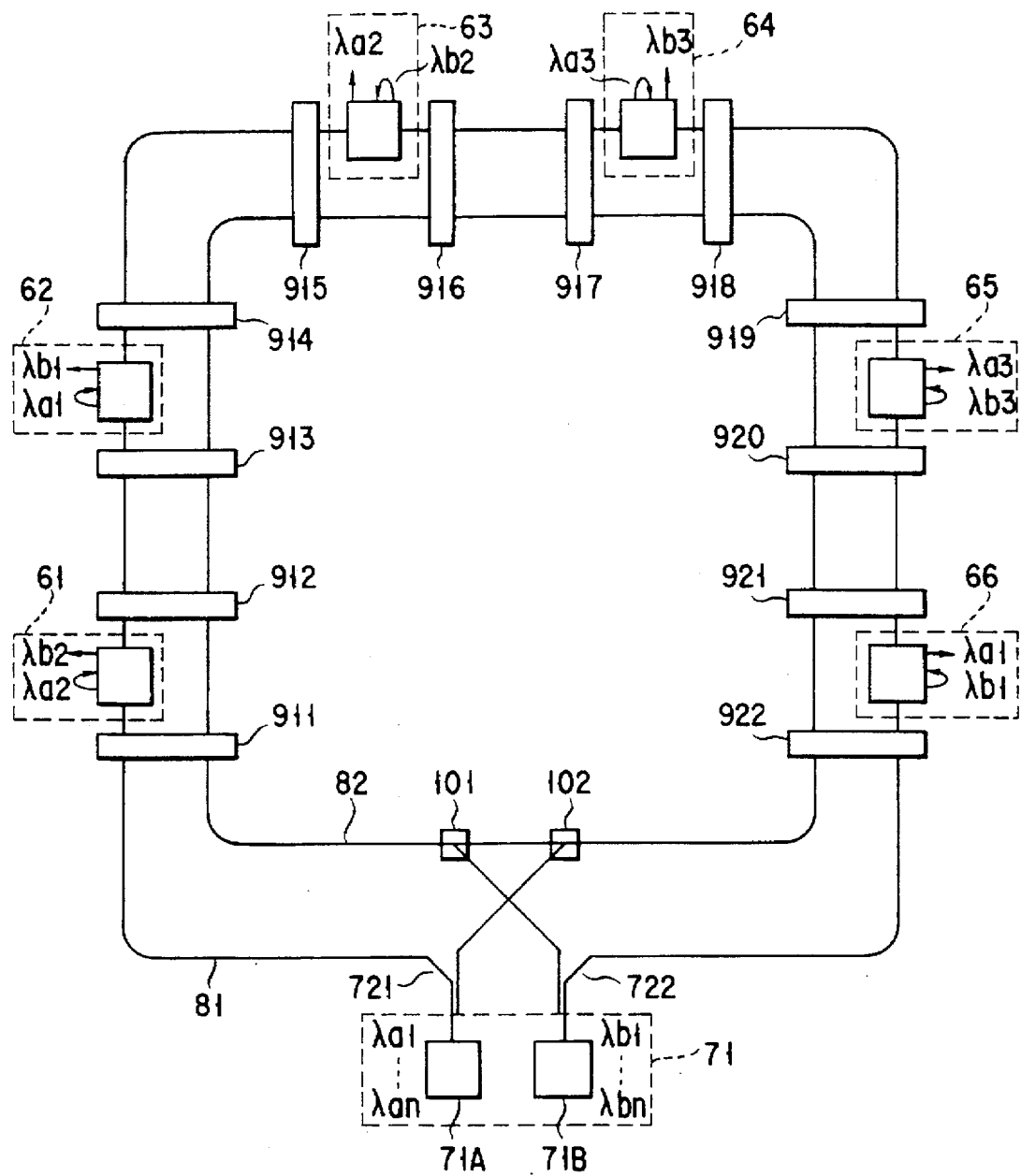
FIG. 11 is a block diagram showing an embodiment of an optical wavelength division multiplexed network system in which a loop is formed in a double form.

FIG. 11 shows an embodiment of an optical wavelength division multiplexed network system in which a loop is formed in a double form.

In FIG. 11, 71 denotes a multi-wavelength light source, 721 and 722 denote directional couplers, 61 to 66 denote nodes, and 911 to 922 denote optical switches. Further, 81 denotes a first main trunk line (service fiber) and 82 denotes a second main trunk line (protection fiber). As the multi-wavelength light source 71, two multi-wavelength light sources for $\lambda a$ ($\lambda 1$ to $\lambda 3$) and $\lambda b$ ($\lambda 1'$ to $\lambda 3'$) may be provided.

As shown in FIG. 12, the node 61 includes the ADM 611, optical receivers 612, 614, modulator 613, and modulation direction controller 617 and includes wavelength division multiplexed couplers (which are hereinafter referred to as WDM couplers) 61a, 61b instead of the optical distributors. The distribution ratio of a WDM coupler 903 is 50% for $\lambda a$ and 0% for $\lambda b$, and the distribution ratio of a WDM coupler 904 is 0% for $\lambda a$ and 50% for $\lambda b$. The other nodes 62 to 66 have the same construction.

With the above construction, light of the wavelength of $\lambda a$ is output to the first main trunk line 81 to propagate in the clockwise direction and light of the wavelength of $\lambda b$ is output to the first main trunk line 81 to propagate in the counterclockwise direction.

In normal operation, the optical switches 911 to 922 pass the light as it is as shown in FIG. 13A. Therefore, each light is dropped in a preset node, thereby permitting communications between the nodes as described before.

Figure 14:
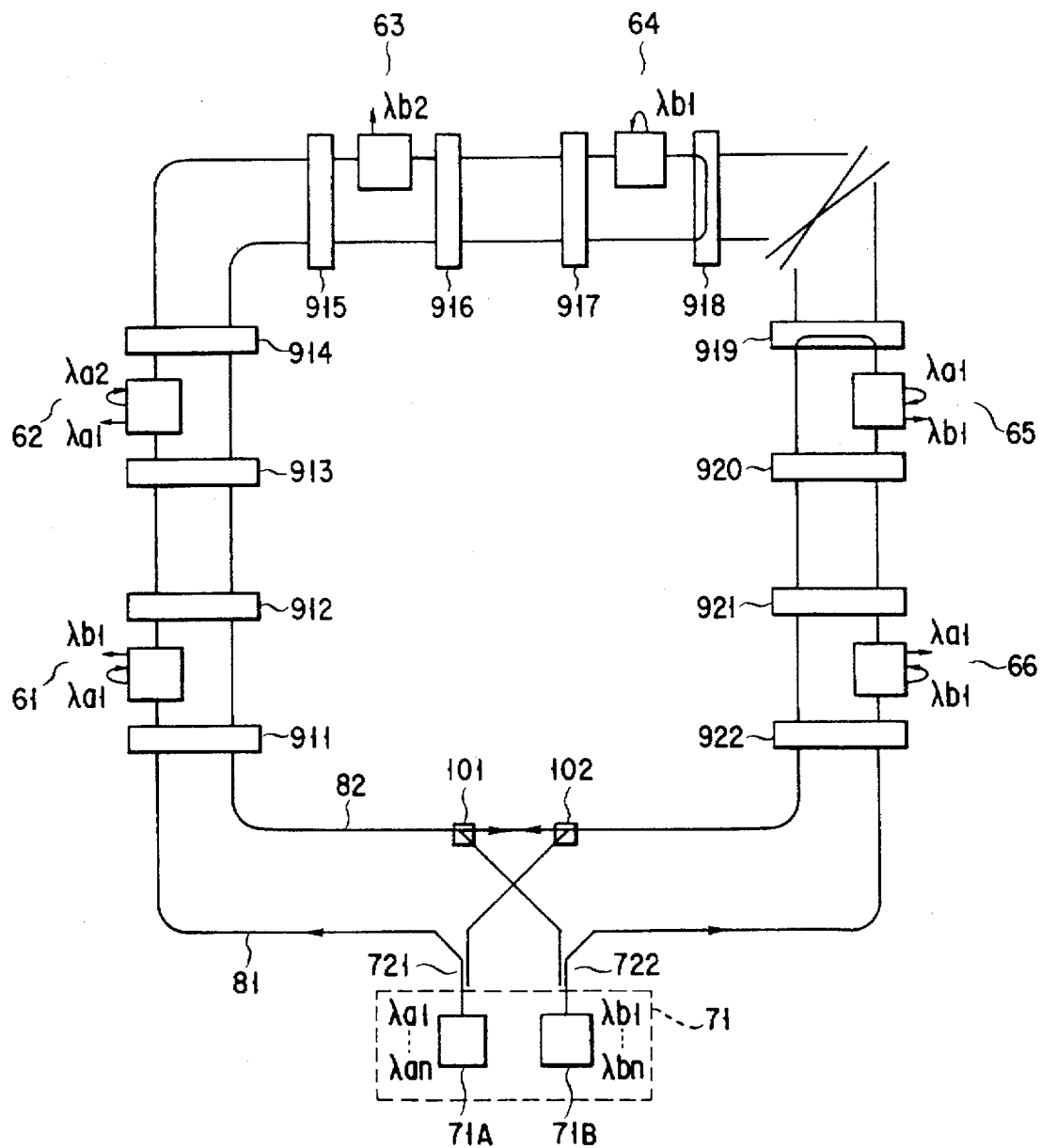
FIG. 14 is a diagram for illustrating a case wherein both of the two main trunk lines are broken down in the above embodiment.

Next, a case wherein both of the two main trunk lines 81, 82 are cut off as shown in FIG. 14 is supposed. In this case, interruption of the communication can be prevented by setting the switching positions of the optical switches 918, 919 as shown in FIG. 13B. However, for some communicating destinations, it is possible to bypass the trunk lines by adequately setting the switching positions of the optical switches 101, 102.

Further, although not shown in the drawing, in a case wherein only one trunk line is cut off in the same portion or a case wherein the node is damaged, interruption of the communication to the other node can be prevented by setting the switching positions of the optical switches 918, 919 as shown in FIG. 13C.

Although not shown in the drawing, the above switching control operation can be monitored and controlled by use of a network management system containing the communication protocol in each node.

As described above, in the optical wavelength division multiplexed network system of the above embodiment, interruption of the communication can be prevented particularly when the trunk line is cut off or the node is damaged.

The above embodiment is an example in which the node is provided only in one main trunk line, but nodes can be provided in the both main trunk lines.

Figure 15:
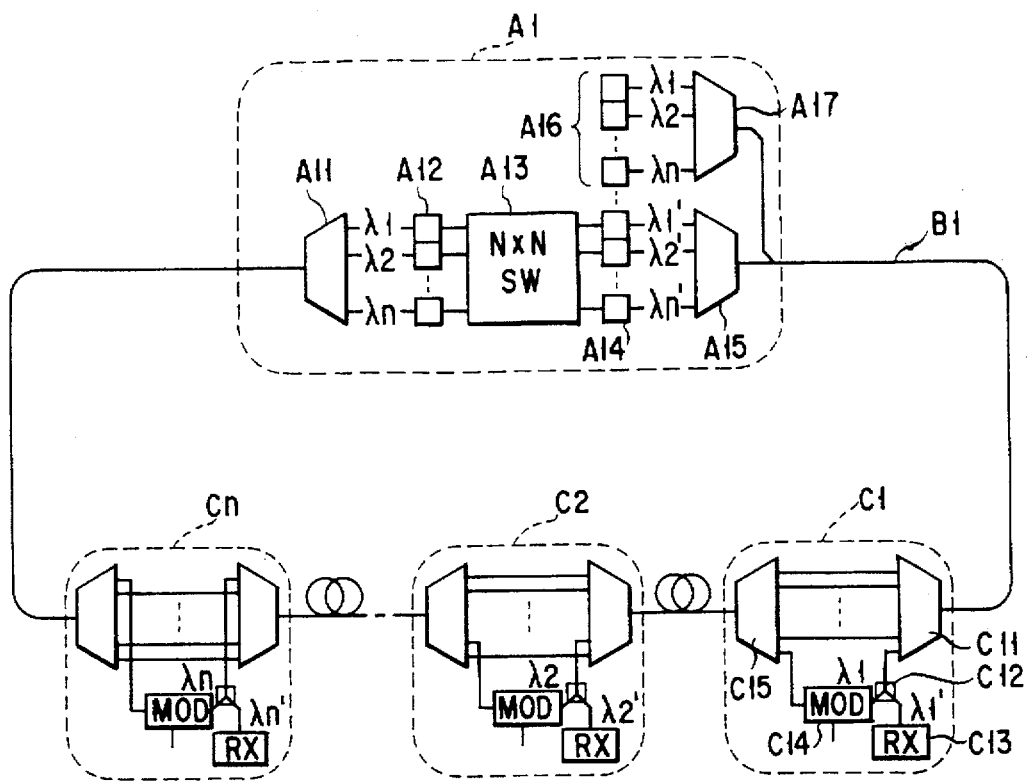
FIG. 15 is a block circuit diagram showing the construction of an embodiment of an optical wavelength division multiplexed network system according to this invention.

FIG. 15 shows another embodiment according to this invention. In FIG. 15, A1 denotes a central node, B1 denotes a main trunk line constructed by an optical fiber arranged in a ring form, and C1 to Cn denote terminal nodes.

The terminal node C1 includes an optical wavelength demultiplexer C11 for demultiplexing optical signals of n combinations of wavelengths ($\lambda 1 + \lambda 1'$) from the main trunk line B1, an optical wavelength demultiplexer C12 for demultiplexing optical signals of wavelengths $\lambda 1$ and $\lambda 1'$ from the demultiplexed optical signal of (λ1+λ1'), an optical receiver (RX) C13 for receiving the demultiplexed optical signal of wavelength λ1', an optical modulator (MOD) C14 for modulating the demultiplexed optical signal of wavelength λ1 according to a transmission signal, and an optical wavelength division multiplexer C15 for multiplexing the modulated transmission optical signal with optical signal other than λ1 and λ1' from the optical wavelength demultiplexer C11 and transmitting the multiplexed signal to the next node on the main trunk line B1. The other terminal nodes C2 to Cn have the same construction.

The central node A1 includes an optical wavelength demultiplexer A11 for demultiplexing optical signals of wavelengths λ1 to λn modulated by the terminal nodes C1 to Cn from the main trunk line B1, optical-electrical converters A12 for converting the demultiplexed optical signals of wavelengths λ1 to λn into corresponding electrical signals, an N×N electronic switch (SW) A13 for switching the electrical signals according to their respective node destinations, electrical-optical converters A14 for converting the switched electrical signals into optical signals of wavelengths λ1' to λn' assigned to the respective destination nodes, and an optical wavelength division multiplexer A15 for multiplexing the converted optical signals and transmitting the multiplexed signal to the main trunk line B1, and further includes a multi-wavelength light source A16 for emitting lights of wavelengths λ1 to λn as the optical sources of the terminal nodes C1 to Cn, and an optical wavelength division multiplexer A17 for multiplexing optical signals of a plurality of wavelengths output from the multi-wavelength light source A16 and transmitting the multiplexed signal to the main trunk line B1.

Figure 16A:
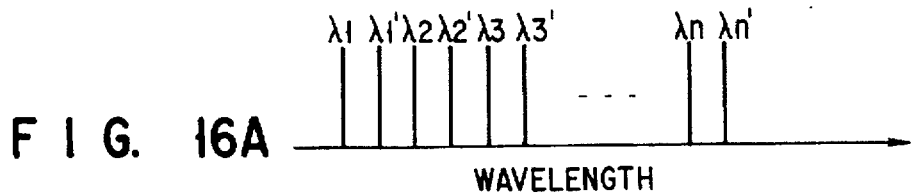
FIGS. 16A and 16B are timing diagrams showing the interlace wavelength assignment system and FSR wavelength assignment system as the method for assigning the transmission and reception wavelengths in the above embodiment.
Figure 16B:
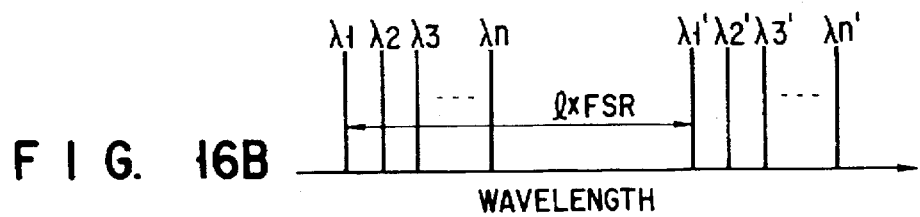

As described before, the k-th terminal node Ck can receive optical signals at wavelength λk' and transmit optical signals at wavelength λk. Some methods for assigning the transmission and reception wavelengths can be considered. For example, the interlace assignment system for setting the transmission wavelength λk and the reception wavelength λk' of the same node adjacent to each other as shown in FIG. 16A and the FSR system for separating the transmission wavelength λk and the reception wavelength λk' of the same node from each other by an integer multiple (1×FSR) of the free spectral range (FSR) of filters constructing the optical wavelength demultiplexer Ck1 and the optical wavelength division multiplexer Ck5. In this case, it is assumed that the wavelength characteristic of the filter is repeated in a preset range. In order to divide the transmission light and the reception light, an optical demultiplexer Ck2 is provided as an additional filter.

In recent years, by acousto-optic technology or optical waveguide technology, optical add-drop wavelength division multiplexed filters (ADM filters) have been developed. In such a four-port filter, it is possible to draw in or insert only light of a preset wavelength. Light of other wavelengths pass straight through the filter uneffected.

Figure 17:
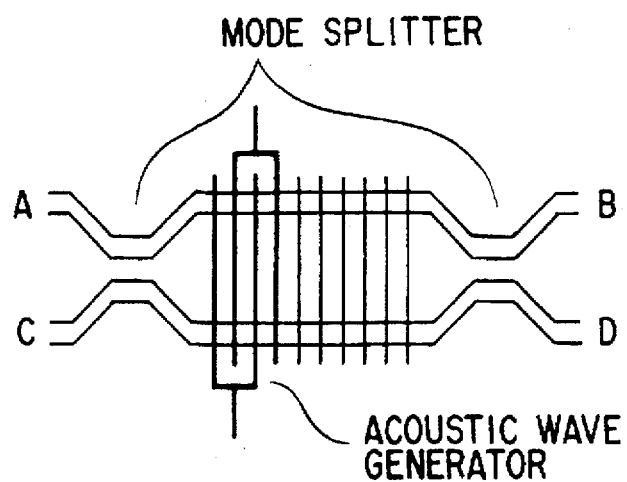
FIG. 17 is a construction diagram showing the construction of an acousto-optic filter used as an ADM filter in the above embodiment.
Figure 18A:
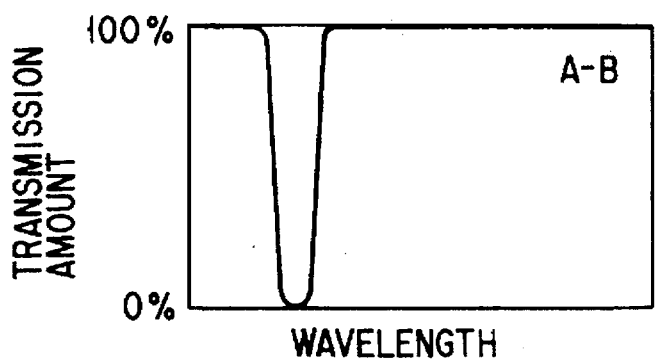
FIGS. 18A and 18B are characteristic diagrams respectively showing the filter characteristics of the acousto-optic filter between A and B and between A and D.
Figure 18B:
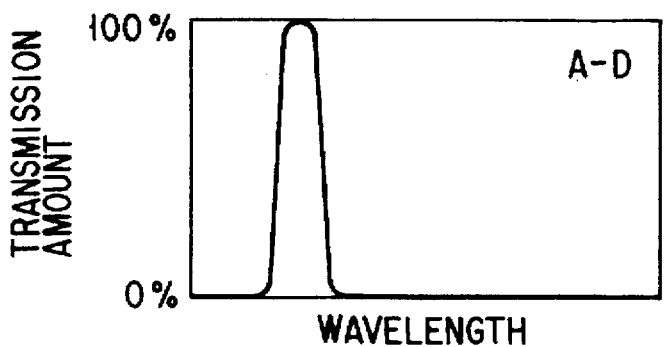

For example, in the case of the acousto-optic filter shown in FIG. 17, the add/drop wavelength is determined by the acoustic drive frequency. However, when a plurality of wavelengths are simultaneously drawn in, it is necessary to simultaneously drive the filter by use of acoustic signal of a plurality of frequencies. The wavelength-transmission characteristic between the A and B terminals is shown in FIG. 18A and the wavelength-transmission characteristic between the A and D terminals is shown in FIG. 18B.

Figure 19:
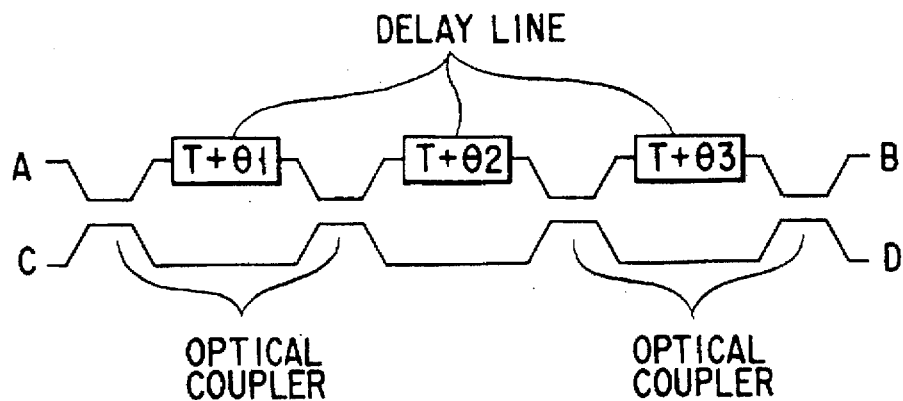
FIG. 19 is a construction diagram showing the construction of a waveguide lattice filter used as the above ADM filter.
Figure 20A:
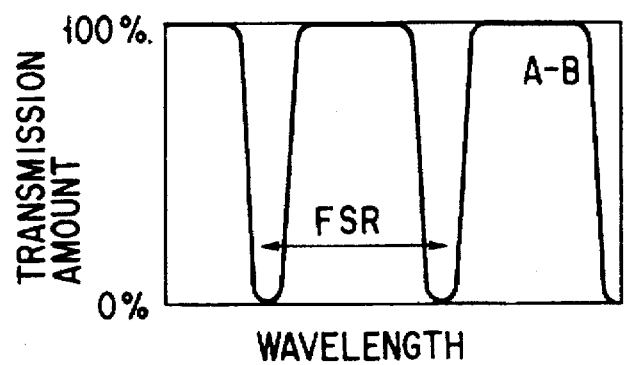
FIGS. 20A and 20B are characteristic diagrams respectively showing the filter characteristics of the waveguide lattice filter between A and B and between A and D.
Figure 20B:
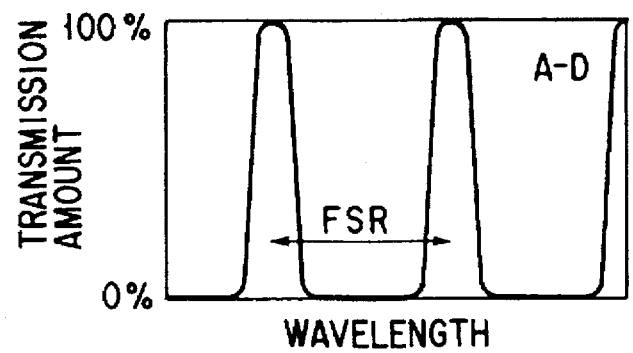

Further, in the case of a waveguide type lattice filter shown in FIG. 19, the transmission characteristic is repeated in a wavelength region. The repetition interval is called the free spectral range (FSR). One or a plurality of wavelengths can be drawn in the FSR according to the design of the filter. The wavelength-transmission characteristic between the A and B terminals is shown in FIG. 20A and the wavelength-transmission characteristic between the A and D terminals is shown in FIG. 20B.

In the above embodiment, the node construction can be simplified by realizing the optical wavelength division multiplexer and optical wavelength demultiplexer of each of the terminal nodes C1 to Cn by use of one ADM filter. The construction is shown in FIG. 21 and is explained by taking the k-th terminal node Ck as an example.

In FIG. 21, an optical signal from the main trunk line B1 is input to the ADM filter Ck6 and only optical signals of wavelengths λk and λk' are directed to the optical wavelength division multiplexer (WDM) Ck2. In the optical wavelength division multiplexer Ck2, optical signals of λk and λk' are demultiplexed. The optical signal of λk' is directed to and received by the optical receiver (RX) Ck3 and then output from the optical receiver. The optical signal of λk is directed to the optical modulator (MOD) Ck4, modulated according to a transmission signal and then transmitted to the main trunk line B1 via the ADM filter Ck6 together with optical signals of other wavelengths.

If the transmission system of the network utilizes the interlace assignment system, the optical wavelength division multiplexer Ck2 may be designed to have such a filter characteristic as shown in FIG. 22A, and if the transmission system of the network utilizes the FSR system, the optical wavelength demultiplexer Ck2 may be designed to have such a filter characteristic as shown in FIG. 22B.

However, if the node is constructed by use of the ADM filter Ck6, there is a possibility that isolation between the two output terminals of the filter is imperfect and the transmission signal will be significantly degraded. Particularly, when the isolation is approx. 30 dB or less, CW light transmitted from the central node A1 cannot be completely drawn in a node to which the wavelength of the light is assigned and an extremely small part of the CW light is left on the main trunk line. As a result, the light interferes with the modulated light of the same wavelength to deteriorate the signal. This is called interference noise.

In order to solve the above problem, it is necessary to form a filter having isolation of 30 dB or more, but it is extremely difficult to form such a filter by the present manufacturing techniques. Therefore, it is necessary to consider another method for suppressing the interference noise.

One well-brown method is shown in FIG. 23. Roughly speaking, this system is constructed by serially connecting two ADM filters Ck7 and Ck8.

In the example shown in FIG. 23, an optical signal of λ1 is separated from optical signals of the other wavelengths by the first-stage ADM filter Ck7, the optical signal of λ1 is modulated with data to be transmitted by the optical modulator (MOD) Ck4, and then the thus obtained signals are multiplexed by the next-stage ADM filter Ck8. Further, an optical signal of λk' is separated from optical signals of the other wavelengths by the ADM filter Ck8, the optical signal of λk' is received by the optical receiver (RX) Ck3 and the optical signals of the other wavelengths are transmitted to the main trunk line B1.

The filter characteristic of each of the ADM filters Ck7, Ck8 may be set as shown in FIG. 24A–24C in the case of interlace assignment system and as shown in FIG. 24D–24F in the case of FSR assignment system.

As another method for suppressing the interference noise, a scrambler system using a modulator having a high-speed polarization scramble function or phase scramble function is considered.

As shown in FIG. 25, in the scrambler system, the output of the optical modulator (MOD) Ck4 is passed through a polarization or phase scrambler (SCR) Ck9 to scramble the polarized wave or phase such that the average degree of polarization or phase coherency will be zero in each bit period of the data before the output of the optical modulator (MOD) Ck4 is transmitted to the main trunk line B1 by the ADM filter Ck6. According to this system, the interference noise can be eliminated by use of a conventional low-pass electrical filter of simple construction at the receiver.

As another method, a system for suppressing the interference noise in the time domain may be considered. In this case, as the light source of the central node A1, a light source for generating pulses of multi-wavelengths is used instead of a light source for generating continuous-wave signals of multi-wavelengths. The pulse light is drawn in a specified node and modulated, and then the modulated light is inserted between pulses transmitted from the central node A1.

This can be realized by locating an optical delay unit Ck10 between the optical modulator Ck4 and the ADM filter Ck6 as shown in FIG. 26A or 26B. FIG. 26A shows a case wherein the period of light pulse train is the same as the data bit period and FIG. 26B shows a case wherein the duty is 50% or less and the light pulse width is the same as the width of a plurality of data bits. In either case, since a modulation pulse is inserted between light pulses from the central node A1, no interference occurs.

Protection switching can also be implanted in order to enhance the reliability of the optical communication network, and the protection switching can be applied to a system according to this invention. FIG. 27 shows the construction thereof. In FIG. 27, portions which are the same as those of FIG. 15 are denoted by the same reference numerals and the detail explanation therefor is omitted.

In this embodiment, trunk lines are formed in a double configuration and protection switches (PSW) A18, A19, Ck11, Ck12 for selectively connecting the main trunk line B1 and protection line B2 to the input/output portions of the nodes A1 and C1 to Cn are provided. Each of the protection switches has three connection modes as shown in FIGS. 28A to 28C.

That is, the same operation as that of the case of FIG. 15 can be attained by use of the main trunk line B1 by setting the redundancy selection switches in a parallel connection configuration as shown in FIG. 28A.

When on of the main trunk line B1 and sub-trunk line B2 is cut off, the communication process can be maintained by setting the redundancy selection switches on both sides of the cut-off portion in a cross-coupled configuration as shown in FIG. 28B so as to detour the cut-off portion.

Further, when both of the main trunk line B1 and sub-trunk line B2 are cut off at the same portion, the communication process can be maintained by setting the protection switches on both sides of the cut-off portion in a loop-back configuration as shown in FIG. 28C.

By use of the redundancy construction as described above, the communication state of the network can be maintained by adequately setting the switching positions of the protection switches located on both sides of each node even when the main trunk line B1 or sub-trunk line B2 is cut off or the node itself is damaged, thus enhancing the reliability.

This invention is not limited to the above embodiment and can be variously modified without departing from the technical scope thereof.

As described above, according to this invention, an optical wavelength division multiplexed network system based on the optical fiber ring system in which the number of light sources required for the terminal node can be reduced and stabilization of the light source can be easily controlled can be provided.

Although, in the embodiment as shown in FIGS. 8 and 12, the traveling wave type modulator is used as the modulator 613 and the modulation direction controller 617 is added thereto, an electro absorption modulator may be used as the modulator 613 in which case the modulation direction controller 617 is not required.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical wavelength division multiplexed network system in which an optical fiber acting as a main trunk line interconnects a plurality of nodes in a ring form to permit communications between desired ones of said nodes, comprising:

a multi-wavelength light source for multiplexing and transmitting a plurality of lights having different wavelengths; and optical splitting means for splitting and outputting lights transmitted from said multi-wavelength light source to both ends of said main trunk line for respective wavelengths;

wherein each of said nodes includes an add-drop multiplexer for extracting light of a particular wavelength among the lights of a plurality of wavelengths transmitted via said main trunk line into the node and inserting the light of the preset wavelength from the node into the optical fiber acting as said main trunk line, at least one optical receiver for receiving part of the light extracted by said add-drop multiplexer, and a modulator for modulating the light extracted by said add-drop multiplexer with data to be transmitted and send the light back to said add-drop multiplexer.

2. An optical wavelength division multiplexed network system according to claim 1, wherein said multi-wavelength light source includes a plurality of single-mode lasers and a controller for controlling the wavelengths of said plurality of lasers.

3. An optical wavelength division multiplexed network system according to claim 1, wherein said multi-wavelength light source includes a multi-mode laser for outputting laser light corresponding to a plurality of longitudinal modes at fixed wavelength intervals, and a filter for receiving the laser light from said multi-mode laser and eliminating light of unnecessary wavelength.

4. An optical wavelength division multiplexed network system according to claim 1, wherein said multi-wavelength light source includes a single-mode laser, a modulator for modulating laser light output from said laser according to a high-frequency signal, and a filter for eliminating light of unnecessary wavelength from the light output from said modulator.

5. An optical wavelength division multiplexed network system according to claim 1, wherein said multi-wavelength light source includes a single-mode laser, a modulator for modulating laser light output from said laser according to a sign function signal, and a filter for eliminating light of unnecessary wavelength from the light output from said modulator.

6. An optical wavelength division multiplexed network system according to claim 1, wherein said modulator is a traveling wave type modulator and a modulation direction controller is further added.

7. An optical wavelength division multiplexed network system according to claim 1, wherein said modulator is an electro absorption modulator.

8. An optical wavelength division multiplexed network system according to claim 1, wherein said add-drop multiplexer of each of said nodes has two add-drop input/output terminals in addition to input/output terminals connected to said main trunk line, third and fourth optical circulators are connected to the add-drop input/output terminals, and said third optical circulator and said fourth optical circulator are selectively connected to modulators by means of optical switches.

9. An optical wavelength division multiplexed network system according to claim 1, further comprising a sub-trunk line formed of an optical fiber connected in a ring form together with said main trunk line;

optical switches connected to optical signal input/output terminals of each of said plurality of nodes and selectively connected to said main trunk line and sub-trunk line; and switching means for selectively switching the direction of transmission light between said main trunk line and said sub-trunk line.

10. An optical wavelength division multiplexed network system in which an optical fiber acting as a main trunk line interconnects a plurality of nodes in a ring form to permit communications between desired ones of said nodes, comprising:

a multi-wavelength light source for multiplexing and transmitting a plurality of lights having different wavelengths; and optical splitting means for splitting and outputting lights transmitted from said multi-wavelength light source to both ends of said main trunk line for respective wavelengths;

wherein each of said nodes includes an add-drop multiplexer for extracting light of a particular wavelength among the lights of a plurality of wavelengths transmitted via said main trunk line into the node and inserting the light of the preset wavelength from the node into the optical fiber acting as said main trunk line, at least one optical receiver for receiving part of the light extracted by said add-drop multiplexer, and a modulator for modulating the light extracted by said add-drop multiplexer with data to be transmitted and send the light back to said add-drop multiplexer, wherein first and second optical circulators connected to each other via a sub-trunk line are selectively connected between said main trunk line and input and output portions of each of said nodes by optical switches.

11. An optical wavelength division multiplexed network system based on an optical fiber ring system in which a cable of optical fiber is connected in a loop form to form a main trunk line between the light input and output terminals of a central node with a plurality of terminal nodes located in desired positions of said main trunk line to permit communications between desired ones of said terminal nodes via said central node, wherein said network system is a network in which different transmission wavelengths and reception wavelengths are assigned to said respective terminal nodes; said central node includes a multi-wavelength light source for generating lights of transmission wavelengths respectively assigned to said plurality of terminal nodes, optical wavelength division demultiplexer means for demultiplexing the optical signals from said main trunk line for respective wavelengths, opto-electronic converting means for receiving the optical signals of respective wavelengths demultiplexed by said optical wavelength division demultiplexer means, switching means for switching the electrical signals obtained in said opto-electronic converting means for respective destinations, electro-optic converting means for converting the electrical signals switched by said switching means into optical signals of wavelengths assigned to respective destination nodes, and optical wavelength division multiplexer means for multiplexing the optical signals transmitted by said electro-optic converting means and transmitting the multiplexed signal to said main trunk line; and each of said plurality of terminal nodes includes first optical wavelength division demultiplexer means for extracting optical signals of transmission wavelength and reception wavelength assigned to its own node from said main trunk line, second optical wavelength demultiplexer means for demultiplexing an optical signal of transmission wavelength and an optical signal of reception wavelength from the optical signal output of said first optical wavelength demultiplexer means, an optical receiver for receiving an optical signal of the reception wavelength demultiplexed by said second optical wavelength demultiplexer means, an optical modulator for modulating an optical signal of the transmission wavelength demultiplexed by said second optical wavelength demultiplexer means with data to be transmitted, and optical wavelength division multiplexer means for multiplexing the optical signal output from said optical modulator with optical signals which are not extracted by said first optical wavelength demultiplexer means and transmitting the multiplexed signal to said main trunk line.

12. An optical wavelength division multiplexed network system according to claim 11, wherein said central node includes pulse forming means for converting lights of the transmission wavelength of each of said terminal nodes generated from said multi-wavelength light source into a pulse form of constant period; and each of said plurality of terminal nodes includes delay means for transmitting the light pulse modulated by said optical modulator to said optical wavelength division multiplexer with time delay and multiplexing the light pulses between the light pulses from said central node.

13. An optical wavelength division multiplexed network system according to claim 11, wherein each of said plurality of terminal nodes includes scramble means for scrambling the light modulated by said optical modulator according to at least one of the polarization or phase scramble functions and transmitting the scrambled light to said optical wavelength division multiplexer.

14. An optical wavelength division multiplexed network system according to claim 13, wherein the average degree of polarization for every bit time is made zero when said scramble means effects the polarization scramble function.

15. An optical wavelength division multiplexed network system according to claim 13, wherein the phase coherency for every bit time is made zero when said scramble means effects the phase scramble function.

16. An optical wavelength division multiplexed network system according to claim 11, further comprises a sub-trunk line formed of an optical fiber connected in a ring form together with said main trunk line; and in which each of said central node and said terminal nodes includes optical switches connected to optical signal input/output terminals thereof and selectively connected to said main trunk line and sub-trunk line.

* * * * *